US012280545B2

(12) United States Patent
Thiel et al.

(10) Patent No.: US 12,280,545 B2
(45) Date of Patent: Apr. 22, 2025

(54) APPARATUS AND METHOD

(71) Applicant: Nikon SLM Solutions AG, Luebeck (DE)

(72) Inventors: Christiane Thiel, Luebeck (DE); Daniel Brueck, Luebeck (DE); Ralf Labes, Ploen (DE)

(73) Assignee: Nikon SLM Solutions AG, Luebeck (DE)

( * ) Notice: Subject to any disclaimer, the term of this patent is extended or adjusted under 35 U.S.C. 154(b) by 468 days.

(21) Appl. No.: 17/613,763

(22) PCT Filed: May 27, 2020

(86) PCT No.: PCT/EP2020/064694
§ 371 (c)(1),
(2) Date: Nov. 23, 2021

(87) PCT Pub. No.: WO2020/244993
PCT Pub. Date: Dec. 10, 2020

(65) Prior Publication Data
US 2022/0194010 A1    Jun. 23, 2022

(30) Foreign Application Priority Data

Jun. 6, 2019    (DE) ...................... 10 2019 004 020.1

(51) Int. Cl.
*B29C 64/255*    (2017.01)
*B22F 12/00*    (2021.01)
(Continued)

(52) U.S. Cl.
CPC ............ *B29C 64/255* (2017.08); *B22F 12/38* (2021.01); *B22F 12/70* (2021.01); *B29C 64/135* (2017.08);
(Continued)

(58) Field of Classification Search
CPC ..... B28B 1/001; A61C 13/0019; B22F 10/28; B22F 10/31; B22F 10/32; B22F 10/322;
(Continued)

(56) References Cited

U.S. PATENT DOCUMENTS

| 4,431,257 | A   | * | 2/1984 | Born   | ......................... | G02B 5/24 |
|           |     |   |        |        |                           | 359/845   |
| 2010/0044922 | A1 | * | 2/2010 | Higashi | ................. | B29C 64/371 |
|           |     |   |        |        |                           | 264/405   |

(Continued)

FOREIGN PATENT DOCUMENTS

| CN | 105965015 | 9/2016 |
|----|-----------|--------|
| CN | 107257729 | 10/2017 |

(Continued)

OTHER PUBLICATIONS

Scaggs Michael et al: "Thermal lensing compensation optics for high power lasers", Laser Resonators and Beam Control XIII, SPIE, vol. 7913, No. 1, Feb. 10, 2011, pp. 1-9.
(Continued)

*Primary Examiner* — Jamel M Nelson
(74) *Attorney, Agent, or Firm* — Williams Mullen; Thomas F. Bergert

(57) ABSTRACT

We describe an apparatus for producing a three-dimensional workpiece, the apparatus comprising: a process chamber for receiving a material from which the three-dimensional workpiece is producible using an additive layer manufacturing technique, wherein the process chamber comprises a translucent window; an irradiation device for irradiating, through the translucent window, the material for producing the three-dimensional workpiece; and an enclosure arranged between the translucent window of the process chamber and the irradiation device, wherein at least a part of the enclosure is translucent for an irradiation beam stemming from the irradiation device to travel from the irradiation device
(Continued)

Figure 1:
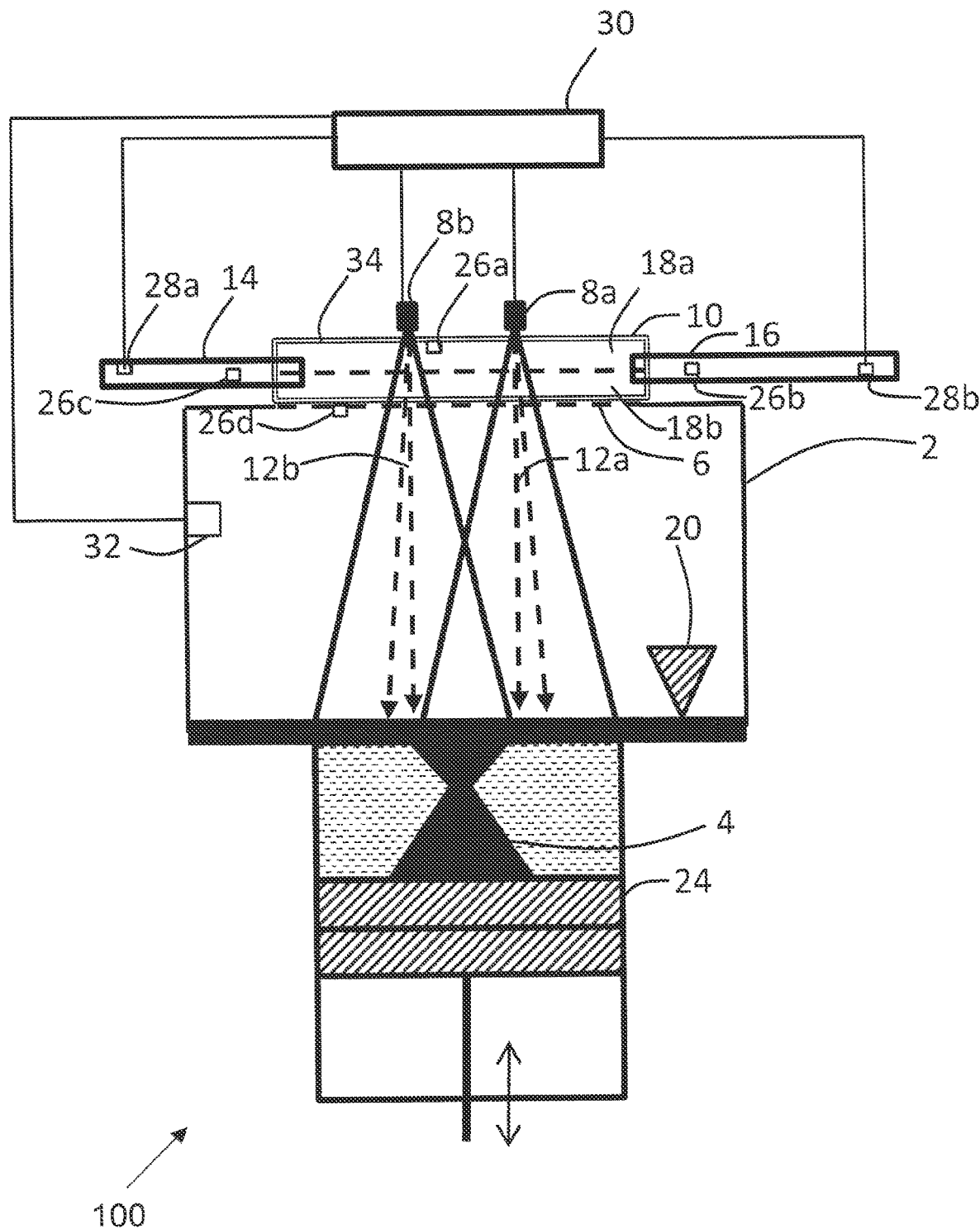

through the enclosure to the material for producing the three-dimensional workpiece, wherein the enclosure comprises an inlet and an outlet, and wherein the apparatus is configured to control a flow of a fluid through the enclosure via the inlet and the outlet.

16 Claims, 2 Drawing Sheets

(51) Int. Cl.
| | |
|---|---|
| *B22F 12/70* | (2021.01) |
| *B29C 64/135* | (2017.01) |
| *B29C 64/393* | (2017.01) |
| *B33Y 10/00* | (2015.01) |
| *B33Y 30/00* | (2015.01) |
| *B33Y 50/02* | (2015.01) |
| *A61C 13/00* | (2006.01) |
| *B22F 10/28* | (2021.01) |
| *B22F 10/36* | (2021.01) |
| *B22F 12/90* | (2021.01) |

(52) U.S. Cl.
CPC ............ *B29C 64/393* (2017.08); *B33Y 10/00* (2014.12); *B33Y 30/00* (2014.12); *B33Y 50/02* (2014.12); *A61C 13/0019* (2013.01); *B22F 10/28* (2021.01); *B22F 10/36* (2021.01); *B22F 12/90* (2021.01)

(58) Field of Classification Search
CPC ........ B22F 10/34; B22F 10/36; B22F 10/366; B22F 12/38; B22F 12/70; B22F 12/90; B29C 64/135; B29C 64/153; B29C 64/165; B29C 64/255; B29C 64/264; B29C 64/393; B29C 64/286
See application file for complete search history.

(56) References Cited

U.S. PATENT DOCUMENTS

| | | | |
|---|---|---|---|
| 2011/0259862 A1* | 10/2011 | Scott ...................... | B23K 26/34 219/121.73 |
| 2017/0266762 A1 | 9/2017 | Dave et al. | |
| 2018/0272611 A1 | 9/2018 | Cantzler et al. | |
| 2019/0143445 A1 | 5/2019 | Stecker | |

FOREIGN PATENT DOCUMENTS

| | | |
|---|---|---|
| CN | 107428079 | 12/2017 |
| CN | 108068342 | 5/2018 |
| CN | 108994293 | 12/2018 |
| CN | 109844907 | 6/2019 |
| DE | 102005030067 A1 | 12/2006 |
| DE | 102015223474 A1 | 6/2017 |
| EP | 2342042 A1 | 7/2011 |
| EP | 3067132 A1 | 9/2016 |
| JP | H09174274 | 7/1997 |
| JP | 3159640 B2 * | 4/2001 |
| JP | 2008233760 | 10/2008 |
| JP | 2010046694 | 3/2010 |
| JP | 2012141515 A | 7/2012 |
| JP | 2016-502603 | 1/2016 |
| JP | 2016-191144 | 11/2016 |
| JP | 2018080393 | 5/2018 |
| WO | 2010026397 A1 | 3/2010 |
| WO | 2018064066 | 4/2018 |

OTHER PUBLICATIONS

Thombansen Ulrich et al: "Process observation in fiber laser-based selective laser melting", Optical Engineering, Soc. of Photo-Optical Instrumentation Engineers, vol. 54, No. 1, Jan. 1, 2015, p. 11008-1 to p. 11008-7.
German Search Report for International Application DE 10 2019 004 020.1, German Patent and Trademark Office, Feb. 14, 2020.
International Search Report and Written Opinion for PCT/EP2020/064694, European Patent Office, Sep. 1, 2020.
Japan Patent Office, Japanese Examination Report for JP Patent Application No. 2021-572517, Aug. 23, 2022.
Chinese National Intellectual Property Administration, Office Action for Chinese Patent Application No. 202080041616.7, Dec. 20, 2022.
Japan Patent Office, Japanese Office Action for JP Patent Application No. 2022-518943, Aug. 18, 2020.

* cited by examiner

```
┌─────────────────────────────────────┐
│     providing, between the irradiation      │
│  device and the material, a fluid or a said │
│      fluid within an at least partially     │
│          translucent enclosure              │
└─────────────────────────────────────┘  S202
                    │
                    ▼
┌─────────────────────────────────────┐
│       controlling, in order to control the   │
│     irradiation beam, an optical property of │
│        an irradiation beam path of the       │
│    irradiation beam between the irradiation  │
│     device and the material by controlling   │
│    an optical property of one or more of:    │
│      the fluid, the enclosure based on       │
│     controlling the fluid, and an interface  │
│      between the fluid and the enclosure     │
│         based on controlling the fluid       │
└─────────────────────────────────────┘  S204
                    │
                    ▼
┌─────────────────────────────────────┐
│     controlling the irradiation beam by      │
│      controlling a temperature of the        │
│   apparatus, in particular a temperature     │
│  of the irradiation device, by controlling a │
│             flow of the fluid                │
└─────────────────────────────────────┘  S206
```

200

Figure 2

APPARATUS AND METHOD

This application is the U.S. national phase of international application PCT/EP2020/064694, filed on May 27, 2020, which claims the benefit of German application DE 10 2019 004 020.1 filed on Jun. 6, 2019; all of which are hereby incorporated herein in their entirety by reference.

The present invention generally relates to an apparatus for producing a three-dimensional workpiece and a method for controlling an irradiation beam of an irradiation device of an apparatus for producing a three-dimensional workpiece.

In additive layering methods, workpieces are produced layer-by-layer by generating a sequence of solidified and interconnected workpiece layers. These processes may be distinguished by the type of raw material and/or the way of solidifying said raw material in order to produce the workpiece.

For example, powder bed fusion is a kind of additive layering process by which pulverulent, in particular metallic and/or ceramic raw materials, can be processed to three-dimensional workpieces of complex shapes. To that end, a raw material powder layer is applied onto a carrier and subjected to, for example, laser irradiation in a site selective manner in dependence on the desired geometry of the workpiece that is to be produced. The laser irradiation penetrating into the powder layer causes heating and consequently melting or sintering of the raw material powder particles. Further raw material powder layers are then applied successively to the layer on the carrier that has already been subjected to laser treatment, until the workpiece has the desired shape and size. Selective laser melting or laser sintering can be used in particular for the production of prototypes, tools, replacement parts or medical prostheses, such as, for example, dental or orthopaedic prostheses, on the basis of CAD data.

On the other hand, fused deposition modelling or material jetting represent different types of additive layering processes. In this case, raw material is supplied to a type of printing head which deposits said material onto a carrier where it then solidifies to the desired shape.

An important parameter of additive layer construction methods is the quality of the produced workpieces. As quality may be affected by various parameters, known solutions do not always achieve the desired quality.

Therefore, it is an object of the present invention in particular to improve quality of workpieces produced using an additive layer manufacturing technique.

The invention is set out in the independent claims. Preferred embodiments of the invention are outlined in the dependent claims.

In a first aspect according to the present disclosure, there is provided an apparatus for producing a three-dimensional workpiece, the apparatus comprising: a process chamber for receiving a material from which the three-dimensional workpiece is producible using an additive layer manufacturing technique, wherein the process chamber comprises a translucent window; an irradiation device for irradiating, through the translucent window, the material for producing the three-dimensional workpiece; and an enclosure arranged between the translucent window of the process chamber and the irradiation device, wherein at least a part of the enclosure is translucent for an irradiation beam stemming from the irradiation device to travel from the irradiation device through the enclosure to the material for producing the three-dimensional workpiece, wherein the enclosure comprises an inlet and an outlet, and wherein the apparatus is configured to control a flow of a fluid through the enclosure via the inlet and the outlet.

The translucent window may, for example, be or comprise a translucent solid window. The translucent solid window may comprise, for example, glass and/or another material which does not absorb (or does not fully absorb) the irradiation beam stemming from the irradiation device (for the particular wavelength(s) used). In some examples, the translucent window may be or comprise an opening in the process chamber, whereby the opening may be covered via a solid translucent layer or component, which may comprise glass and/or another material which does not absorb (or does not fully absorb) the irradiation beam stemming from the irradiation device (for the particular wavelength(s) used).

The condition (for example temperature) of the beam entry window when the irradiation beam enters into the process chamber may depend on the irradiation process and its parameters. This may influence the beam path such as, for example, the beam direction and focusing parameters.

The apparatus according to the present disclosure may allow for producing a stable surrounding for the irradiation beam path of an additive manufacturing apparatus/machine. A new way for controlling the beam and/or beam parameters in the apparatus for producing a three-dimensional workpiece is provided.

The part of the enclosure which is translucent may be translucent for light on two sides in order to allow for an irradiation beam to pass through the enclosure. In some examples, a top wall (or part) of the enclosure and a bottom wall (or part) of the enclosure may at least in parts be translucent, whereby the bottom wall faces towards the process chamber and the top wall faces towards the irradiation device.

The enclosure is separate from a volume of the process chamber in which the material is solidified using an additive layer manufacturing technique in order to produce the three-dimensional workpiece.

The enclosure may be shaped and/or formed in different ways. In some examples, the enclosure may comprise a tube (for example a flexible tube) or a duct (for example a flexible duct) which may be arranged between the process chamber (that is the translucent window of the process chamber) and the irradiation device. The tube and/or the duct may be open at different ends such that the fluid may stream from one side of the tube/duct to the other side.

Based on controlling the flow of the fluid through the enclosure via the inlet and the outlet, stable temperature conditions may be preserved. This may allow for providing stable conditions for the irradiation beam path from the irradiation device via the enclosure and the translucent window to the material which is to be solidified. Stable conditions for the irradiation beam path may provide for improved quality of the three-dimensional workpiece, in particular as the irradiation beam path is well defined. The stable temperature conditions and hence the conditions for the irradiation beam path may be provided in particular based on controlling the flow of the fluid such that, for example, excessive heat which may occur during the manufacturing process for producing the three-dimensional workpiece may be extracted via the flow of fluid. Additionally, controlling the flow of fluid within the enclosure may allow for controlled steering of the irradiation beam based on conditions within the enclosure and/or at an interface between the enclosure and the fluid, which conditions may be influenced, for example, by the temperature conditions and other conditions as will be outlined further below in more detail.

Any components of the apparatus, for example the window of the process chamber, which are translucent relates to components which are transparent to light of one or more specific wavelengths or wavelength ranges. Light of the one more specific wavelengths or wavelength ranges may hence be allowed to pass through the translucent components of the apparatus.

The fluid may, in some examples, be a gas, a liquid, a solid material within a gas or a liquid, or any combination thereof.

In some examples of the apparatus, the enclosure forms at least a part of a wall of the process chamber. This may be particularly advantageous as the conditions for the irradiation beam path may be controlled more precisely given that the irradiation beam may have to travel through fewer components of the apparatus.

In some examples of the apparatus, the enclosure comprises the translucent window. This may allow for further decreasing the number of components of the apparatus through which the irradiation beam may need to travel from the irradiation device to the material from which the three-dimensional workpiece is producible. As a result, quality of the three-dimensional workpiece may be improved as the conditions of the irradiation beam path may be more precisely controlled.

In some examples, the apparatus further comprises one or more sensors coupled to and/or arranged within one or more of the inlet, the outlet and the enclosure for sensing the fluid and/or an area surrounding the enclosure, wherein the apparatus is configured to control, based on the sensed fluid and/or area, one or more parameters of the fluid within the enclosure. In some examples, the one or more sensors comprise one or more temperature sensors and/or one or more optical sensors (for example cameras, for example for performing thermography).

The one or more sensors may, in some examples, be arranged outside of the enclosure (additionally or alternatively to being arranged within one or more of the inlet, the outlet and the enclosure for sensing the fluid).

The area surrounding the enclosure may comprise one or more of the irradiation device and the process chamber (for example a volume within the process chamber).

The one or more parameters of the fluid within the enclosure may comprise one or more of the temperature of the fluid, the flow speed of the fluid, the dwell time of the fluid within the enclosure, the pressure of the fluid, the cleanliness of the fluid and the composition of the fluid.

In some examples, the cleanliness may be determined by optical means, such as laser diffraction. Additionally or alternatively, the cleanliness may be determined via the electrical or thermal conductivity of the fluid and/or the composition of the fluid.

As time for producing the three-dimensional workpiece progresses, transparent components of the apparatus may suffer from increased contamination. This may result in increased absorption of the irradiation beam (for example the laser beam) over time, which may lead to an increased temperature which can then be removed via the fluid. Determining the cleanliness may therefore, in some examples, be taken into consideration when controlling one or more properties of the fluid so as to in particular adequately control the temperature.

Maintaining the temperature of the fluid within the enclosure and/or the temperature of the irradiation device and/or the temperature of the volume within the process chamber at a target temperature or within a target temperature range may allow for keeping the irradiation beam path (i.e. optical path) conditions constant for improved irradiation beam steering, which may result in improved quality of the three-dimensional workpiece to be produced from the material which may be solidified by the irradiation beam.

In some examples of the apparatus, the inlet and/or the outlet comprises one or more control devices configured to control one or more properties of the fluid. The one or more properties of the fluid may hereby relate in particular to physical properties of the fluid, such as, but not limited to, a temperature of the fluid, a flow speed of the fluid, a dwell time of the fluid within the enclosure, a pressure of the fluid, a cleanliness of the fluid, and a composition of the fluid.

In some examples of the apparatus, the enclosure comprises a plurality of enclosures arranged within a beam path of the irradiation beam from the irradiation device to an interior of the process chamber (to the material from which the three-dimensional workpiece is to be produced). In some examples, the plurality of enclosures may hereby be arranged in parallel to each other, such that the irradiation beam may travel consecutively through one enclosure after the other. In some examples, the plurality of enclosures may be arranged in parallel to each other and generally in parallel to the irradiation beam path from the irradiation device to the interior of the process chamber, such that multiple beams may travel through corresponding, respective enclosures to the interior of the process chamber.

In some examples, different enclosures may be filled with different fluids. For example, a first fluid with a heat transfer coefficient which is higher than a heat transfer coefficient of a second fluid may be arranged closer to any parts or components of the apparatus from which heat may be extracted.

The arrangement of the enclosures with respect to each other and/or with respect to one or more other parts or components of the apparatus may depend on the purpose of a said fluid within the respective enclosure. For example, multiple enclosures might be provided in order to extract heat from different components. For example, frame-shaped water cooling for a glass holder in addition to a gas cooling of glass may be provided, whereby, in some examples, only the latter may be transparent/translucent.

Hence, in some examples, the apparatus is configured to control a said flow of a first said fluid through a first said enclosure and to control a said flow of a second said fluid through a second said enclosure, the first fluid being different from the second fluid.

In examples of the apparatus in which one or more sensors such as temperature sensors are provided, the apparatus may be configured to control the dwell time within the respective enclosure and/or the flow speed of both or all fluids together and/or each fluid individually.

The apparatus may additionally or alternatively control whether one or fluids are present within a set enclosure.

The apparatus may be configured to control which one or more fluids may be provided within the irradiation beam path. The apparatus may hence be configured to control which wavelength or wavelengths may penetrate the enclosure(s) given the one more fluids being provided within the enclosure or enclosures.

In some examples of the apparatus, the irradiation device is configured to provide a plurality of beam paths for the irradiation beam from the irradiation device through the enclosure. The irradiation beam may hereby be scanned over different parts of the material from which the three-dimensional workpiece is to be produced.

In some examples of the apparatus, a wall of the enclosure comprises a cavity for controlling, via a fluid within said cavity, a physical property of the enclosure. The physical property of the enclosure may hereby relate in particular to a shape and/or temperature of the enclosure. The cavity may be filled with a fluid (gas and/or liquid) to influence the physical property or properties of the enclosure. Controlling the temperature of the enclosure may allow for controlling a temperature of the fluid within the enclosure. Controlling a shape of the enclosure may allow for controlling optical properties of the irradiation beam path when travelling through the enclosure.

In some examples, the apparatus further comprises an optical control unit for controlling an irradiation beam path of a said irradiation beam based on an optical property of a said fluid and/or of an interface between a said fluid and the translucent part of the enclosure, and wherein said controlling of said flow of said fluid through the enclosure comprises controlling said flow based on said optical property for controlled steering of said irradiation beam.

In some examples, the optical property comprises a refractive index change from the fluid to the translucent part of the enclosure. Additionally or alternatively, the optical property comprises a focal length of the optical system, which is comprised of the translucent part of the enclosure and/or the fluid within the enclosure and/or the translucent window of the process chamber (which may be formed by the enclosure), along the irradiation beam path. The refractive index may be significantly changed if a liquid rather than a gas is introduced into the enclosure.

The focal length of the optical system may be changed by changing a pressure within the enclosure. The change in pressure may result in the translucent part of the enclosure and/or the translucent window changing their shape, resulting in a change of focal length of the optical system for the irradiation beam. The apparatus may, in this regard, comprise, in some examples, a pressure regulating unit in order to change the pressure within the enclosure. The pressure may be changed based on controlling the fluid and in particular a flow of the fluid within the enclosure.

The optical control unit, when controlling steering of the irradiation beam, may take into account the wavelength of the irradiation beam. Dispersion may hence be taken into consideration. The control unit may therefore be coupled to the irradiation device so as to provide the control unit with information regarding the wavelength or wavelengths of the irradiation device. Additionally or alternatively, the wavelength or wavelengths of the irradiation device may be provided to the optical control unit separately, for example by inputting the information into an input of the optical control unit.

In some examples, the optical property is based on a fluid composition and/or fluid temperature of a said fluid, and wherein said controlling of said flow of said fluid through the enclosure comprises controlling said flow based on said fluid composition and/or said fluid temperature for said controlled steering of said irradiation beam. The composition of the fluid may hereby be changed in particular by providing a plurality of enclosures, as outlined above, whereby different fluids may be introduced into different enclosures.

As outlined above, in some examples, the optical property comprises a refractive index of a said fluid, and wherein said controlling of said flow of said fluid through the enclosure comprises controlling said refractive index for said controlled steering of said irradiation beam. Additionally or alternatively, the optical property comprises a focal length of components of the apparatus through which the irradiation beam travels from the irradiation device to the interior of the process chamber (i.e. to the location where the irradiation beam impinges on the material from which the three-dimensional workpiece is to be produced).

In some examples, the focal length may be adjusted by changing the pressure within the enclosure so as to deform the translucent part of the enclosure and/or the translucent window of the process chamber. The translucent part of the enclosure and/or the translucent window of the process chamber may hereby function as an optical lens or lenses whose focal length may be varied upon the pressure within the enclosure being changed.

In some examples, the translucent window and/or the translucent part of the enclosure respectively comprise an optical lens.

In some examples of the apparatus, the optical control unit is configured to determine an irradiation beam spot diameter of said irradiation beam in the process chamber (in particular when the irradiation beam impinges on the material which is used in order to produce the three-dimensional workpiece), and wherein said controlled steering of said irradiation beam comprises controlling said irradiation beam spot diameter based on said optical property controlled by controlling said flow of said fluid. The determination of the irradiation beam spot diameter may, for example, be calculated based on the wavelength of the irradiation beam and the optical properties of the optical system (comprising one or more of the translucent part of the enclosure, the fluid within the enclosure, the translucent window of the process chamber, and an interior volume of the process chamber), in particular the focal length of the optical system. Additionally or alternatively, the irradiation beam spot diameter may be determined optically using, for example, a camera which captures the irradiation beam spot in the process chamber when the irradiation beam impinges on the material used for producing the three-dimensional workpiece. In some examples, the camera may capture a shape or geometry of the irradiation beam within the process chamber and/or of the irradiation beam spot.

In some examples, the camera may additionally or alternatively be used when determining the cleanliness in the enclosure.

Controlling the irradiation beam spot diameter based on the optical property controlled by controlling the flow of the fluid may be particularly advantageous as the irradiation beam spot diameter may be varied between states in which the beam may be used to solidify the material to produce the three-dimensional workpiece (for example relatively small irradiation beam spot diameter) or to pre-heat or post-heat (for example relatively large irradiation beam spot diameter) the material prior to or after solidifying the material. Different modes of operation when using the irradiation beam may therefore be controlled by controlling the flow of the fluid within the enclosure. In some examples, the irradiation beam (spot) diameter (or melt pool size) may be controlled to be smaller than during a pre-heating of the material. Larger areas may be melted/solidified, whereby precision may be smaller than for a small melt pool.

In some examples of the apparatus, the optical property of said interface between a said fluid and the translucent part of the enclosure comprises a shape and/or a temperature and/or a state of stress of said interface, and wherein said controlled steering of said irradiation beam comprises controlling said shape and/or said temperature and/or said state of stress of said interface by controlling said flow of said fluid. The irradiation beam may be controlled by controlling the shape and/or the temperature and/or the state of stress of the interface. The state of stress of the interface may allow for steering the beam, for example based on using photoelastic properties of the translucent part of the enclosure.

In some examples, the apparatus is configured to control said shape and/or said temperature and/or said state of stress by controlling a pressure of said fluid within the enclosure. The pressure of the fluid may be controlled relatively precisely, such that precise controlling of the irradiation beam by controlling the shape and/or the temperature and/or the state of stress of the interface is possible.

In any of the examples of the apparatus as described throughout the present disclosure, the apparatus may be configured to take into account (for example via the apparatus being coupled to the irradiation device and/or via the wavelength being input into an input of the apparatus) the wavelength of the irradiation beam so as to control the irradiation beam when travelling from the irradiation device via the enclosure and the translucent window of the process chamber to the material used to produce the three-dimensional workpiece.

We further describe a method for controlling an irradiation beam of an irradiation device of an apparatus for producing a three-dimensional workpiece from a material using an additive layer manufacturing technique, the method comprising: providing, between the irradiation device and the material, a fluid or a said fluid within an at least partially translucent enclosure, and controlling, in order to control the irradiation beam, an optical property of an irradiation beam path of the irradiation beam between the irradiation device and the material by controlling an optical property of one or more of: the fluid, the enclosure based on controlling the fluid, and an interface between the fluid and the enclosure based on controlling the fluid.

In some examples, the method further comprises controlling the irradiation beam by controlling a temperature of the apparatus, in particular a temperature of the irradiation device, by controlling a flow of the fluid.

Any of the above-described examples of the apparatus may equally be used when performing the method for controlling the irradiation beam.

We further describe an apparatus according to any of the examples as described herein, wherein the apparatus further comprises a fluid arranged within the enclosure. The fluid may, in some examples, comprise a liquid or a gas.

Any of the examples of the apparatus as described herein may further comprise a mechanical closing mechanism for covering the enclosure and/or for closing a particular area (for example an optical module and/or the enclosure and/or the process chamber) which may, for example, not comprise a continuous window. The mechanical closing mechanism may, in some examples, be intransparent to light of any wavelength. The mechanical closing mechanism may, in some examples, be an iris closing mechanism or a lid. The mechanical closing mechanism may protect the enclosure and/or other components of the apparatus (for example the optical module and/or the process chamber), which may in particular be arranged adjacent to or be coupled to the enclosure, for example while one or more parts of the apparatus are dismounted from the apparatus.

These and other aspects of the invention will now be further described, by way of example only, with reference to the accompanying figures, wherein like reference numerals refer to like parts, and in which:

FIG. 1 shows a schematic illustration of an apparatus according to some example implementations as described herein; and FIG. 2 shows a flow diagram of a method according to some example implementations as described herein.

Examples of the apparatus as described herein may comprise beam entrance glass fluid circulation functionality.

The condition and/or temperature of the beam entry window (translucent window of the process chamber and/or translucent part(s) of the enclosure) may depend on the laser (or generally irradiation) process and its parameters, which may influence the beam path, for example beam direction and focusing parameters. Furthermore, the (laser) beam steering measures (for example scanner parameters) may lack a degree of freedom.

Examples of the apparatus and methods as described herein may allow for producing a stable surrounding for the laser beam path of the additive manufacturing apparatus/machine. A new degree of freedom for the beam parameters, in particular for beam steering, may be provided.

The apparatus comprises an enclosure (volume) that is transparent for light on two sides, in order to allow a light/laser beam to pass through the enclosure. The enclosure is located in the beam path of an additive manufacturing machine and may/or may not fulfill the task to close another volume, for example built chamber, optical scanner housing, etc.

Furthermore the enclosure (volume) contains a fluid inlet and a fluid outlet. The inlet and/or outlet might be equipped with sensors and devices to regulate/control the parameters of the fluid inside the enclosure. It is hereby to be noted that the enclosure is different from a volume of the process chamber in which the material is solidified in order to produce the three-dimensional workpiece.

In some examples, multiple enclosures (volumes) might be positioned in one beam path.

In some examples, multiple beam paths may lead through a single enclosure (volume).

Sensors might be attached inside or outside of the enclosure (volume). The enclosure (volume) may contain a closing mechanism (which may be intransparent to light) to mechanically close the enclosure (for example based on an iris closing mechanism or lid) to protect it while a part of its assembly may be dismounted (from the machine).

The inlet/outlet may contain devices to control/influence the physical properties of the medium (temperature, cleanliness, pressure, composition, etc.).

The enclosure (volume) may contain a gas or liquid (or generally fluid/medium) that is transparent for light at a defined wavelength or wavelength range.

One purpose of the medium inside the enclosure (volume) may be to influence the properties of the light beam path.

Preservation of stable temperature conditions may be ensured. The flowing medium may then transport excessive heat from the light beam path or parts defining the light beam path's geometry/properties (for example glass holder/clamping).

Multiple enclosures (volumes) might be applied to transport the heat from different components (for example frame shaped water cooling for glass holder plus gas cooling of glass, whereby, in some examples, only the second one of the enclosures/volumes may be transparent in this case).

Sides/walls defining the enclosure (volume) may contain a gas/liquid (or generally fluid) themselves to control/influence physical properties (in particular the temperature) of the enclosure (volume).

A defined shift of focal length of the optical system by using media with different refractive indices may be provided (depending on a composition and/or temperature), thus causing an increased light spot diameter in the processing plane.

Based on a defined refraction of light in the enclosure (volume), the build area of a two dimensional scanning device may be increased and/or a new measure of beam positioning may be introduced.

The beam steering properties may additionally or alternatively result from the interaction of light with the interface between the enclosure (volume) and the transparent sides.

The enclosure (volume) and/or its walls might change one or more of its/their form, size, physical properties, temperature and state of stress in order to influence the beam path.

The transport/evacuation of dirt/dust/contamination particles that might occur in the volume may be ensured.

The apparatus and methods as described herein may provide for a clean environment and a stable temperature at the laser beam entry glass.

A new way for influencing/steering the irradiation (for example laser) beam is described. Unwanted effects on the irradiation (for example laser) beam may be compensated for. A new degree of freedom for irradiation (for example laser) beam steering is given.

FIG. 1 shows a schematic illustration of an apparatus 100 according to some example implementations as described herein.

In this example, the apparatus 100 comprises a process chamber 2 in which a three-dimensional workpiece 4 is producible. The material from which the three-dimensional workpiece 4 is producible is received on a carrier 24 which is, in this example, raisable and lowerable. The material is, in this example, spread within the plane in which the three-dimensional workpiece 4 is producible via a coating mechanism 20, which may be a coating blade or the like.

The process chamber 2 comprises a translucent window 6 arranged on a top part of the process chamber 2.

On top of the process chamber 2, an enclosure 10 is arranged between the translucent window 6 of the process chamber 2 and irradiation devices 8a and 8b.

Irradiation beams 12a and b are used in order to melt the material to produce the three-dimensional workpiece in an additive layer manufacturing process.

The irradiation beams 12a and b may hereby be scanned/steered over the material layer, whereby different irradiation beam paths are provided from the irradiation devices 8a and 8b via the enclosure, the translucent window and a volume of the process chamber towards the material.

The apparatus 100 further comprises an inlet 14 and an outlet 16, wherein the apparatus 100 is configured to control a flow of a fluid through the enclosure 10 via the inlet 14 and the outlet 16.

In this example, the enclosure 10 comprises a first enclosure 18a and a second enclosure 18b. The first enclosure 18a and the second enclosure 18b are separated from each other via an interface which comprises at least some parts which are translucent so as for the irradiation beams 12a and b to be able to travel from the irradiation devices 8a and 8b through the enclosures 18a and 18b and the translucent window 6 towards the material layer. In some examples, the first enclosure 18a and the second enclosure 18b have different, respective inlets and outlets, such that different fluids may flow through the first enclosure 18a and the second enclosure 18b, respectively.

In this example, the apparatus 100 further comprises a plurality of sensors 26a, 26b, 26c and 26d.

Sensor 26a is arranged, in this example, within the enclosure 10. Sensor 26a is used, in this example, in order to sense the fluid within the enclosure. The apparatus may then control, based on the sensed fluid, one or more parameters of the fluid within the enclosure. In some examples, sensor 26a is configured to sense a temperature of the fluid within the enclosure. The apparatus may then adjust one or more parameters of the fluid within the enclosure (for example a flow speed of the fluid within the enclosure) in order to maintain the temperature of the fluid within the enclosure at a target temperature or within a target temperature range. Excessive heat stemming from the irradiation process for producing the three-dimensional workpiece may hereby be removed via the fluid flow so as to keep the process conditions constant.

Additionally or alternatively, sensor 26a is used, in some examples, in order to sense an area surrounding the enclosure, and in particular the irradiation devices 8a and 8b (for example a temperature of the irradiation devices 8a and 8b).

Sensors 26b and 26c are, in this example, arranged within the outlet and the inlet, respectively. In this example, sensors 26b and 26c are used in order to sense the fluid, and in particular a temperature of the fluid within the inlet and the outlet, respectively. The apparatus may then adjust one or more parameters of the fluid within the enclosure (for example a flow speed of the fluid within the enclosure) in order to maintain the temperature of the fluid within the enclosure at a target temperature or within a target temperature range. Excessive heat stemming from the irradiation process for producing the three-dimensional workpiece may hereby be removed via the fluid flow so as to keep the process conditions constant.

In this example, the apparatus 100 further comprises a sensor 26d which is arranged within the process chamber underneath the translucent window 6. In this example, sensor 26d is used in order to sense a temperature of the volume within the process chamber, wherein the apparatus is configured to adjust, based on the temperature of the volume within the process chamber sensed by sensor 26d, one or more parameters of the fluid within the enclosure to maintain the temperature within the process chamber at a target temperature or within a target temperature range.

In this example, the apparatus further comprises control devices 28a and 28b. In this example, the control devices 28a and 28b are arranged within the inlet and the outlet, respectively. The control devices 28a and 28b are configured to control one or more properties of the fluid. In particular, the control devices 28a and 28b may comprise heating and/or cooling units in order to adjust a temperature of the fluid. As a result, the temperature of the fluid within the enclosure may be adjusted in order to adjust the amount of heat which may be extracted by the fluid flow from the process chamber to control the temperature within the process chamber. Additionally or alternatively, in some examples, the control devices 28a and 28b are used in order to control a flow speed of the fluid and/or a dwell time of the fluid within the enclosure, the pressure of the fluid within the enclosure, the cleanliness of the fluid and/or the composition of the fluid within the enclosure. The skilled person will be familiar with means in order to adjust these properties of the fluid within the enclosure, for exams pie using pumps in order to adjust the flow speed, the dwell time and/or the pressure, heating and/or cooling units in order to adjust the temperature of the fluid, etc.

The inlet and the outlet, respectively, may comprise means (for example flaps) for introducing and/or extracting different fluids into the different enclosures 18a and 18b.

Alternatively or additionally, different inlets and outlets, respectively, may be provided for the corresponding, respective enclosures.

In this example, the apparatus 100 further comprises an optical control unit 30 which is coupled to the irradiation devices 8a and 8b for controlling an irradiation beam path of the irradiation beams 12a and 12b based on an optical property of the fluid and/or an interface between the fluid and the translucent part of the enclosure. The optical control unit 30 is coupled to the control devices 28a and 28b, such that the controlling of the flow of the fluid through the enclosure comprises controlling the flow based on the optical property for controlled steering of the irradiation beams 12a and 12b.

In this example, the optical control unit 30 is coupled to a camera 32 which is configured to determine an irradiation beam spot diameter of the irradiation beams in the process chamber (when the irradiation beams impinge on the material layer). The controlled steering of the irradiation beams comprises controlling the irradiation beam spot diameter based on the optical property controlled by controlling the flow of the fluid within the enclosure.

The optical control unit 30 may directly control the irradiation devices 8a and 8b and the control devices 28a and 28b. Additionally or alternatively, the controlling of the irradiation beam spot diameter by the optical control unit 30 may be based on a feedback from the camera 32. The irradiation beam spot diameter of the irradiation beams 12a and 12b when impinging on the material may be controlled by one or both of controlling the irradiation devices 8a/8b and the properties of the fluid within the enclosure.

In this example, the enclosure 10 (i.e. a wall of the enclosure) comprises a cavity for controlling, via a fluid within the cavity, a physical property of the enclosure. In some examples, the fluid within the cavity may allow for extracting or providing heat to the fluid within the enclosure.

In this example, the refractive index of the fluid within the enclosure is adjusted based on the flow of the fluid within the enclosure, in particular the composition of the fluid within the enclosure(s). Adjusting the flow of the fluid within the enclosure results, in some examples, in a change of shape and/or state of stress of the translucent window and/or translucent part of the enclosure and/or the interface. Adjusting the flow of the fluid may advantageously allow for steering the irradiation beams and in particular increasing the area which may be irradiated with the irradiation devices.

The irradiation beam spot diameter is changed, whereby a relatively larger spot diameter may be used to pre-heat or post-heat the material which is solidified with an irradiation beam with a relatively smaller spot diameter. In some examples, the irradiation beam spot diameter is increased based on a defined refraction of the irradiation beam within the enclosure.

FIG. 2 shows a flow diagram of a method 200 according to some example implementations as described herein. The method relates in particular to a method for controlling an irradiation beam of an irradiation device of an apparatus for producing a three-dimensional workpiece from a material using an additive layer manufacturing technique.

The method comprises, at step S202, providing, between the irradiation device of the apparatus and the material, a fluid or a said fluid within an at least partially translucent enclosure.

At step S204, the method comprises controlling, in order to control the irradiation beam, an optical property of an irradiation beam path of the irradiation beam between the irradiation device and the material by controlling an optical property of one or more of: the fluid, the enclosure based on controlling the fluid, and an interface between the fluid and the enclosure based on controlling the fluid.

The optical property of the fluid relates, in some examples, to a refractive index of the fluid. Additionally or alternatively, the optical property of the enclosure and/or the interface between the fluid and the enclosure relates, in some examples, to a focal length thereof.

Optionally, at step S206, the method comprises controlling the irradiation beam by controlling a temperature of the apparatus, in particular a temperature of the irradiation device, by controlling a flow of the fluid. The fluid flow may be used in order to remove or provide heat to the apparatus and in particular the irradiation device and/or other components of the apparatus.

No doubt many other effective alternatives will occur to the skilled person. It will be understood that the invention is not limited to the described embodiments and example implementations and encompasses modifications apparent to those skilled in the art and lying within the scope of the claims appended hereto.

The invention claimed is:

1. An apparatus for producing a three-dimensional workpiece, the apparatus comprising:
a process chamber for receiving a material from which the three-dimensional workpiece is producible using an additive layer manufacturing technique, wherein the process chamber comprises a translucent window;
an irradiation device for irradiating, through the translucent window, the material for producing the three-dimensional workpiece; and
an enclosure arranged between the translucent window of the process chamber and the irradiation device, wherein at least a part of the enclosure is translucent and wherein the enclosure allows for an irradiation beam stemming from the irradiation device to travel from the irradiation device through the enclosure to the material for producing the three-dimensional workpiece,
wherein the enclosure comprises an inlet and an outlet,
wherein the apparatus is configured to control a flow of a fluid through the enclosure via the inlet and the outlet, and
the apparatus further comprising an optical control unit for controlling an irradiation beam path of a said irradiation beam based on an optical property of a said fluid and/or of an interface between a said fluid and the translucent part of the enclosure, and wherein said controlling of said flow of said fluid through the enclosure comprises controlling said flow based on said optical property for controlled steering of said irradiation beam.

2. An apparatus as claimed in claim 1, wherein the enclosure forms at least a part of a wall of the process chamber.

3. An apparatus as claimed in claim 2, wherein the enclosure comprises the translucent window.

4. An apparatus as claimed in claim 1, further comprising one or more sensors coupled to and/or arranged within one or more of the inlet, the outlet and the enclosure for sensing the fluid and/or an area surrounding the enclosure, wherein the apparatus is configured to control, based on the sensed fluid and/or area, one or more parameters of the fluid within the enclosure.

5. An apparatus as claimed in claim 4, wherein the one or more sensors comprises one or more temperature sensors for sensing a temperature of the fluid and/or a temperature of the irradiation device and/or a temperature of a volume within the process chamber, and wherein said controlling, by the apparatus, comprises adjusting the one or more parameters of the fluid within the enclosure to maintain the temperature of the fluid within the enclosure and/or the temperature of the irradiation device and/or the temperature of the volume within the process chamber at a target temperature or within a target temperature range.

6. An apparatus as claimed in claim 1, wherein the inlet and/or the outlet comprises one or more control devices configured to control one or more properties of the fluid.

7. An apparatus as claimed in claim 1, wherein the enclosure comprises a plurality of enclosures arranged within a beam path of the irradiation beam from the irradiation device to an interior of the process chamber.

8. An apparatus as claimed in claim 7, wherein the apparatus is configured to control a said flow of a first said fluid through a first said enclosure and to control a said flow of a second said fluid through a second said enclosure, the first fluid being different from the second fluid.

9. An apparatus as claimed in claim 1, wherein the irradiation device is configured to provide a plurality of beam paths for the irradiation beam from the irradiation device through the enclosure.

10. An apparatus as claimed in claim 1, wherein a wall of the enclosure comprises a cavity for controlling, via a fluid within said cavity, a physical property of the enclosure.

11. An apparatus as claimed in claim 1, wherein the optical property is based on a fluid composition and/or fluid temperature of a said fluid, and wherein said controlling of said flow of said fluid through the enclosure comprises controlling said flow based on said fluid composition and/or said fluid temperature for said controlled steering of said irradiation beam.

12. An apparatus as claimed in claim 1, wherein the optical property comprises a refractive index of a said fluid, and wherein said controlling of said flow of said fluid through the enclosure comprises controlling said refractive index for said controlled steering of said irradiation beam.

13. An apparatus as claimed in claim 1, wherein the optical control unit is configured to determine an irradiation beam spot diameter of said irradiation beam in the process chamber, and wherein said controlled steering of said irradiation beam comprises controlling said irradiation beam spot diameter based on said optical property controlled by controlling said flow of said fluid.

14. An apparatus as claimed in claim 1, wherein the optical property of said interface between a said fluid and the translucent part of the enclosure comprises a shape and/or a temperature and/or a state of stress of said interface, and wherein said controlled steering of said irradiation beam comprises controlling said shape and/or said temperature and/or said state of stress of said interface by controlling said flow of said fluid.

15. An apparatus as claimed in claim 14, wherein the apparatus is configured to control said shape and/or said temperature and/or said state of stress by controlling a pressure of said fluid within the enclosure.

16. An apparatus as claimed in claim 1, wherein the translucent window and/or the translucent part of the enclosure respectively comprise an optical lens.

* * * * *